United States Patent
Mazzola

(10) Patent No.: US 9,715,864 B2
(45) Date of Patent: Jul. 25, 2017

(54) LENS TOUCH GRAPHIC EFFECT FOR MOBILE DEVICES

(71) Applicant: Futurewei Technologies, Inc., Plano, TX (US)

(72) Inventor: Anthony J. Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 14/211,287

(22) Filed: Mar. 14, 2014

(65) Prior Publication Data

US 2014/0267437 A1 Sep. 18, 2014

Related U.S. Application Data

(60) Provisional application No. 61/783,805, filed on Mar. 14, 2013.

(51) Int. Cl.
*G09G 5/373* (2006.01)
*G06F 3/041* (2006.01)
*G06F 3/0488* (2013.01)

(52) U.S. Cl.
CPC ............ *G09G 5/373* (2013.01); *G06F 3/041* (2013.01); *G06F 3/0488* (2013.01); *G06F 2203/04805* (2013.01)

(58) Field of Classification Search
None
See application file for complete search history.

(56) References Cited

U.S. PATENT DOCUMENTS

| | | | |
|---|---|---|---|
| 5,206,628 A * | 4/1993 | Kelleher | G06T 11/203 345/505 |
| 7,206,725 B1 * | 4/2007 | Alspach | G06T 15/50 703/2 |
| 7,694,234 B2 | 4/2010 | Fleisher et al. | |
| 2007/0033544 A1 * | 2/2007 | Fleisher | G06F 3/0481 715/800 |

(Continued)

FOREIGN PATENT DOCUMENTS

| | | |
|---|---|---|
| DE | 10310794 A1 | 9/2004 |
| EP | 2352079 A1 | 8/2011 |
| WO | 2007019193 A2 | 2/2007 |
| WO | 2010107653 A2 | 9/2010 |

OTHER PUBLICATIONS

Mazzola, A. J., "User Interface Display Composition with Device Sensor/State Based Graphical Effect," U.S. Appl. No. 13/633,710, filed Oct. 2, 2012, 36 pgs.

(Continued)

*Primary Examiner* — Xiao Wu
*Assistant Examiner* — Steven Elbinger
(74) *Attorney, Agent, or Firm* — Conley Rose, P.C.

(57) ABSTRACT

A method for content displaying implemented by a mobile device that comprises a display, the method comprising detecting a user touch on the display via a graphical user interface, generating a lens animation effect in a region of content based on the user touch, wherein the lens animation effect at least magnifies the region of content shown on the display, and displaying the lens animation effect on the display adjacent to a location of the user touch.

19 Claims, 7 Drawing Sheets

(56) References Cited

U.S. PATENT DOCUMENTS

| | | | |
|---|---|---|---|
| 2007/0097151 A1* | 5/2007 | Rosenberg | G06F 1/1626 345/660 |
| 2009/0021513 A1* | 1/2009 | Joshi | G06T 15/503 345/419 |
| 2010/0090964 A1* | 4/2010 | Soo | G06F 3/0416 345/173 |
| 2010/0107120 A1* | 4/2010 | Sareen | G06F 3/04845 715/821 |
| 2010/0235726 A1* | 9/2010 | Ording | G06F 1/1626 715/234 |
| 2010/0235784 A1 | 9/2010 | Ording et al. | |
| 2011/0141031 A1* | 6/2011 | McCullough | G06F 3/0481 345/173 |
| 2011/0205248 A1* | 8/2011 | Honda | G06F 3/0482 345/661 |
| 2013/0116967 A1* | 5/2013 | Akcasu | G04G 9/00 702/150 |

OTHER PUBLICATIONS

Foreign Communication From a Counterpart Application, PCT Application No. PCT/US2014/027497, International Search Report dated Jul. 25, 2014, 4 pages.

Foreign Communication From a Counterpart Application, PCT Application No. PCT/US2014/027497, Written Opinion dated Jul. 25, 2014, 7 pages.

* cited by examiner

LENS TOUCH GRAPHIC EFFECT FOR MOBILE DEVICES

CROSS-REFERENCE TO RELATED APPLICATIONS

The present application claims priority to U.S. Provisional Patent Application No. 61/783,805 filed Mar. 14, 2013 by Anthony J. Mazzola and entitled "Lens Touch Graphic Effect for Mobile Devices", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Continuous consumer demand for sleeker and more compact portable electronic devices has driven designs to become increasingly smaller, which has led to increasingly limiting constraints on the available surface area of displays on portable electronic device. Furthermore, touch sensitive displays have been incorporated into many portable electronic devices and even desktop computer systems. A touch sensitive display may provide an input mechanism from a user to the portable electronic device through a graphical user interface (GUI). Touch sensitive displays (or touch screens) serve as both a visual display output to the user and an input. Regardless of the resolution of a display, size constraints on the display may remain a limiting factor. The concurrent increase in the number of functions performed by a portable electronic device may further exacerbate the problem.

Constraints on the visual link between the portable electronic device and users may limit or even prevent some users from fully enjoying their device's capabilities due to the limited readability of displays. Thus, there exists a need to provide users of portable electronic devices with enhanced display readability. Also, the mobile nature of portable electronic devices, sometimes referred to as mobile devices, may limit power resources available to the device. Therefore, it may be beneficial to enhance display readability without increasing power consumption.

SUMMARY

In one embodiment, the disclosure includes a method for content displaying implemented by a mobile device that comprises a display, the method comprising detecting a user touch on the display via a graphical user interface, generating a lens animation effect in a region of content based on the user touch, wherein the lens animation effect at least magnifies the region of content shown on the display, and displaying the lens animation effect on the display adjacent to a location of the user touch.

In another embodiment, the disclosure includes an apparatus comprising a touch screen configured to display one or more contents, and one or more processors configured to detect a user touch on the touch screen, magnify a region of contents to create an appearance of an animated lens in response to the user touch, wherein magnifying the region of contents uses a magnification level that at least partially depends on a duration of the user touch, and instruct the touch screen to display the magnified region of contents.

In yet another embodiment, the disclosure includes a computer program product comprising computer executable instructions stored on a non-transitory computer readable medium such that when executed by a computer system cause the computer system to recognize a user touch on a screen of the computer system, render a region of content to simulate an appearance of a lens with a magnification level that varies with a duration of the user touch, and display at least the rendered region of content on the screen.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure teaches example embodiments to create an animated lens effect when a user of a mobile device contacts a touch screen of the mobile device. In an embodiment, the mobile device has sensors that can recognize a user touch on a touch screen. Thus, the mobile device may render a region of content to simulate an appearance of a lens with a magnification level that varies seamlessly with a duration of the user touch. For instance, the magnification level may start from a minimum value (e.g., one) upon detection of the user touch, continuously increase with time to a maximum value, and then seamlessly decrease to the minimum value after the user touch no longer exists. Further, the mobile device may generate an animated lens flare along an edge of the rendered region for tracking movement of the user touch. A spectral intensity of the animated flare may be filtered in both a radial direction and a tangential direction for creating a non-uniform intensity profile. Finally, the touch screen may display the rendered region of content. The rendered region is a magnified version of the original region of content, thus enhanced display readability may be achieved to improve user experience without increasing component costs.

Figure 1:
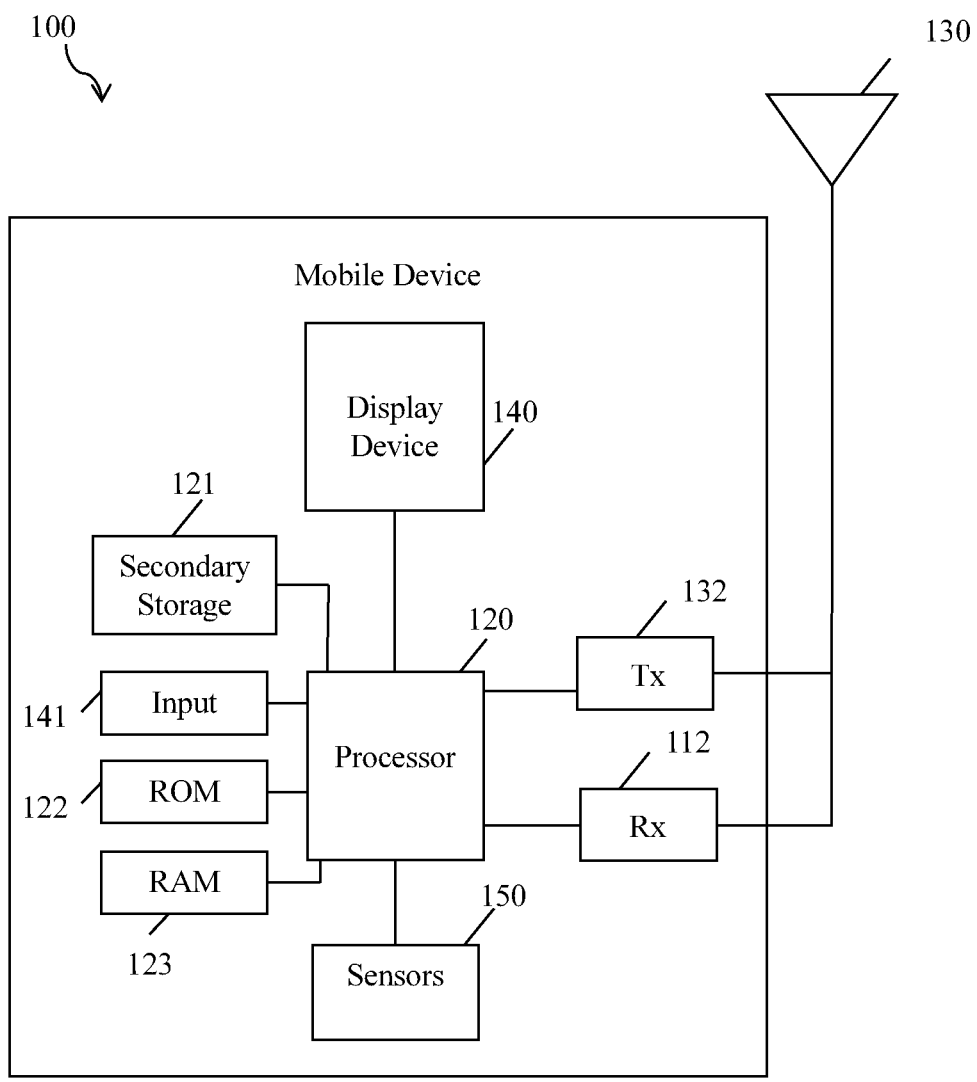
FIG. 1 illustrates an embodiment of a mobile device.

FIG. 1 illustrates an embodiment of a mobile device 100. The mobile device 100 may comprise a two-way wireless communication device having voice and data communication capabilities. In some aspects, voice communication capabilities are optional. The mobile device 100 generally has the capability to communicate with other computer systems on the Internet. Depending on the exact functionality provided, the mobile device 100 may be referred to as a data messaging device, a two-way pager, a wireless e-mail device, a cellular telephone with data messaging capabilities, a wireless Internet appliance, a wireless device, a smart phone, a mobile device, or a data communication device, as examples.

The mobile device 100 may comprise a processor 120 (e.g., a central processor unit (CPU)) that is in communication with memory devices including secondary storage 121, read only memory (ROM) 122, and random access memory (RAM) 123. The processor 120 may be implemented as one or more CPU chips, one or more cores (e.g., a multi-core processor), or may be part of one or more application specific integrated circuits (ASICs) and/or digital signal processors (DSPs). The processor 120 may be configured to implement any of the schemes described herein, and may be implemented using hardware, software, firmware, or combinations thereof.

The secondary storage 121 may be comprised of one or more solid state drives, disk drives, and/or other memory types and is used for non-volatile storage of data and as an over-flow data storage device if RAM 123 is not large enough to hold all working data. Secondary storage 121 may be used to store programs that are loaded into RAM 123 when such programs are selected for execution. The ROM 122 may be used to store instructions and perhaps data that are read during program execution. ROM 122 may be a non-volatile memory device and may have a small memory capacity relative to the larger memory capacity of secondary storage 121. The RAM 123 may be used to store volatile data and perhaps to store instructions. Access to both ROM 122 and RAM 123 may be faster than to secondary storage 121.

The mobile device 100 may communicate data (e.g., packets) wirelessly with a network. As such, the mobile device 100 may comprise a receiver (Rx) 112, which may be configured for receiving data (e.g. Internet Protocol (IP) packets or Ethernet frames) from other components. The receiver 112 may be coupled to the processor 120, which may be configured to process the data and determine to which components the data is to be sent. The mobile device 100 may also comprise a transmitter (Tx) 132 coupled to the processor 120 and configured for transmitting data (e.g. the IP packets or Ethernet frames) to other components. The receiver 112 and transmitter 132 may be coupled to an antenna 130, which may be configured to receive and transmit wireless radio frequency (RF) signals.

The mobile device 100 may also comprise a display device 140 coupled to the processor 120, for displaying output thereof to a user. The mobile device 100 and the display device 140 may be configured to accept a blended image, as discussed below, and display it to a user. The display device 140 may comprise a Color Super Twisted Nematic (CSTN) display, a thin film transistor (TFT) display, a thin film diode (TFD) display, an organic light-emitting diode (OLED) display, an active-matrix organic light-emitting diode (LED) display, or any other display screen. The display device 140 may display in color or monochrome and may be equipped with a touch sensor based on resistive and/or capacitive technologies.

The mobile device 100 may further comprise an input device 141 coupled to the processor 120, which may allow the user to input commands to the mobile device 100. In the case that the display device 140 comprises a touch sensor, the display device 140 may also be considered the input device 141. In addition to and/or in the alternative, an input device 141 may comprise a mouse, trackball, built-in keyboard, external keyboard, and/or any other device that a user may employ to interact with the mobile device 100. The mobile device 100 may further comprise one or more sensors 150 coupled to the processor 120, which may detect conditions in and around the mobile device 100. For example, the sensors 150 may be touch sensors that detect a user touch or a finger contact on the display device 140. The sensors 150 may include force or pressure sensors that detect the force or pressure applied by the user touch or the finger contact to the display device 140.

Figure 2A:
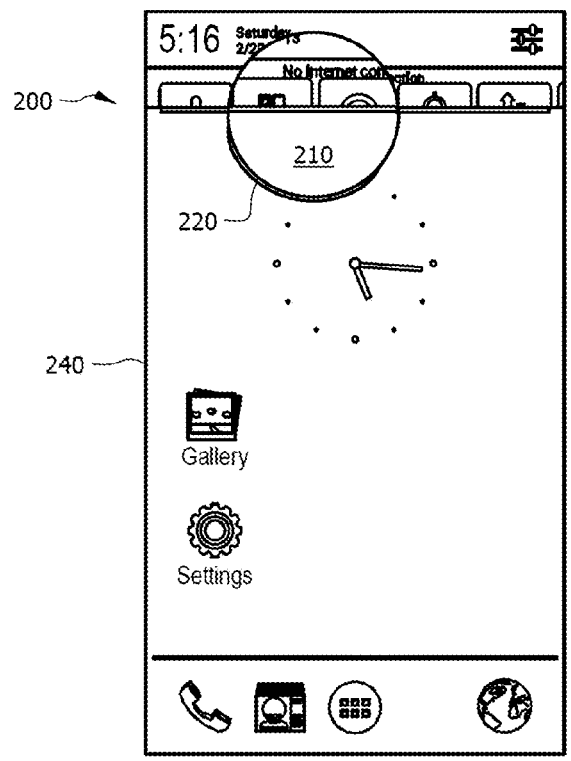
FIGS. 2A and 2B depict examplary lens animation effects.

FIG. 2A illustrates an examplary lens animation effect or feature 200 in the context of a general area of a display device 240, which may be substantially similar to the display device 140. The lens animation effect 200 may be implemented through a GUI (e.g., an emotion user interface) that is displayed to a user via the display device 240, which may reside on a computer system or a mobile communication device, such as the mobile device 100. The lens animation effect 200 may create an appearance for the user, so that the user gets an illusion that the display device glass comprises a magnifying lens. The lens may be pushed around the display area based on a user touch. Intuitively, it is as if the glass was bent by the user touch.

The lens animation effect 200 may comprise several components including a varying magnification and an animated lens flare. The first component of the lens animation effect 200 may be the magnification of an area above the user's finger in response to the user's touch of the display device. This magnified area 210 may be animated and may track the user's finger as the finger moves about the display device. For example, the longer the user touch, the higher the magnification level becomes. The user may hold their finger on the display device for a duration of time (e.g., 1 second, 2-5 seconds, or any other suitable duration) to achieve maximum magnification. The second component of the lens animation effect 200 may be an animated lens flare 220 that may track the finger's direction of movement. The lens flare 220 may be a spectral highlight of any suitable color or colors. The lens flare 220 may be animated to rotate around the magnified area 210. For example, the lens flare 220 may spin around the lens edge until the lens flare 220 settles behind the finger to indicate the direction of finger movement.

Figure 2B:
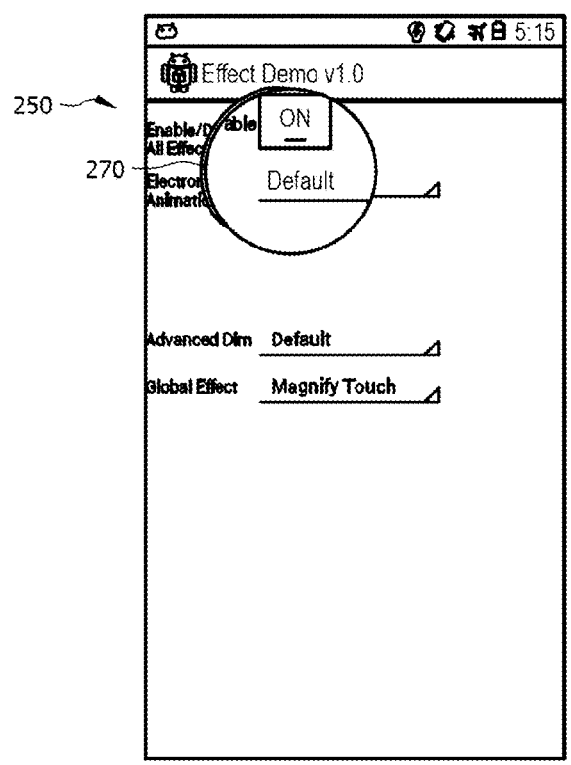

FIG. 2B illustrates an examplary animated lens touch effect 250 in the context of a general area of a display device, which may be substantially similar to the display device 240. The lens touch effect 250 may be a touch sensor-based effect that is similar to the lens animation effect 200, which is sometimes referred to as a lens touch effect. The lens touch effect 250 may use a touch track filter to render a lens distortion that follows the user's finger on the display.

In an embodiment, the lens touch effect 250 includes two main components: magnification and an animated lens flare 270. The lens flare 270 may use the touch sensor direction vector information, which is further described below. The lens flare 270 may spin around the lens (represented by a magnified area) to indicate a direction of finger movement. Magnification of the lens may be slowly and seamlessly animated, e.g., a user holds his finger on the display long enough to achieve maximum magnification. This provides a very smooth effect when the user is tapping on the display, such as with an input method.

Figure 3A:
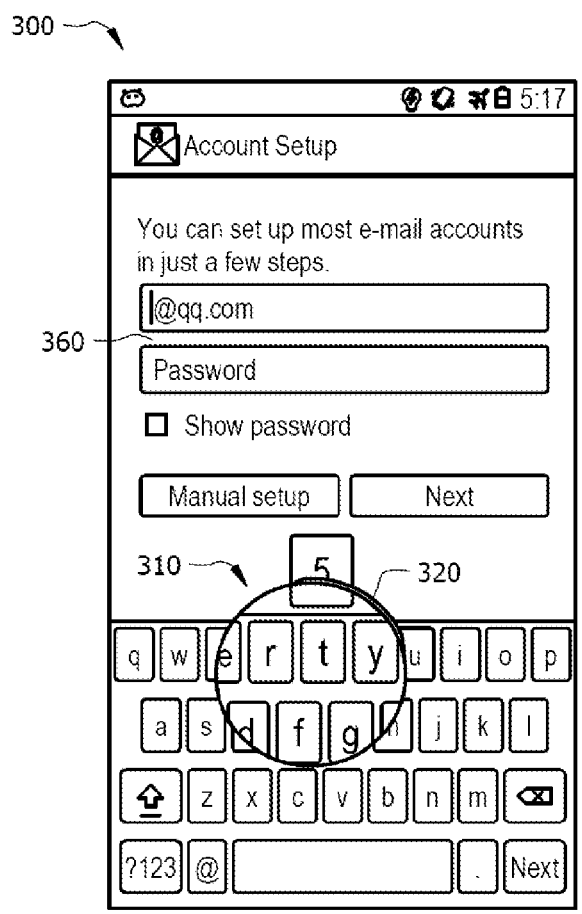
FIG. 3A depicts another examplary lens animation effect implemented on a display screen.
Figure 3B:
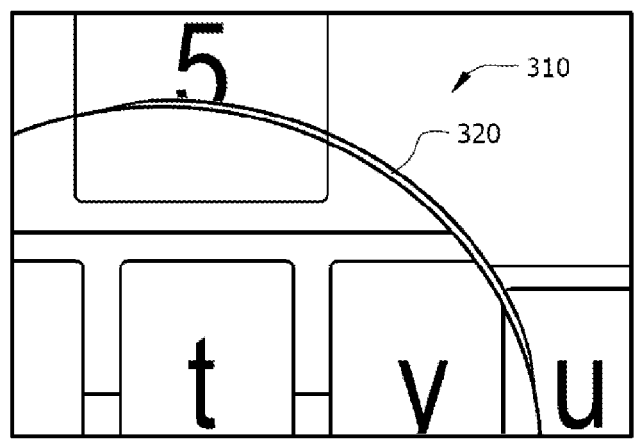
FIG. 3B depicts a close up view of the lens effect feature of FIG. 3A.

FIG. 3A depicts an examplary lens animation effect 300 in the context of an area of display device 360, and FIG. 3B provides a zoomed-in view of the lens animation effect 300 illustrated in FIG. 3A. A magnified area 310 may be substantially similar to magnified area 210 and may cover an intersection of multiple different application surfaces on a display device 360. Furthermore, the magnified area 310 may be displayed alongside unmagnified surface fragments or pixels that fall outside a region of contents occupied by the lens animation effect 300. The lens animation effect 300 may be achieved by working in multiple coordinates systems at the same time. As discussed below, a screen space may comprise Cartesian coordinates of the display device, which may be used to render the lens flare 320 and to test surface pixels to identify where such surface pixels are positioned with respect to the lens animation effect 300.

Figure 4A:
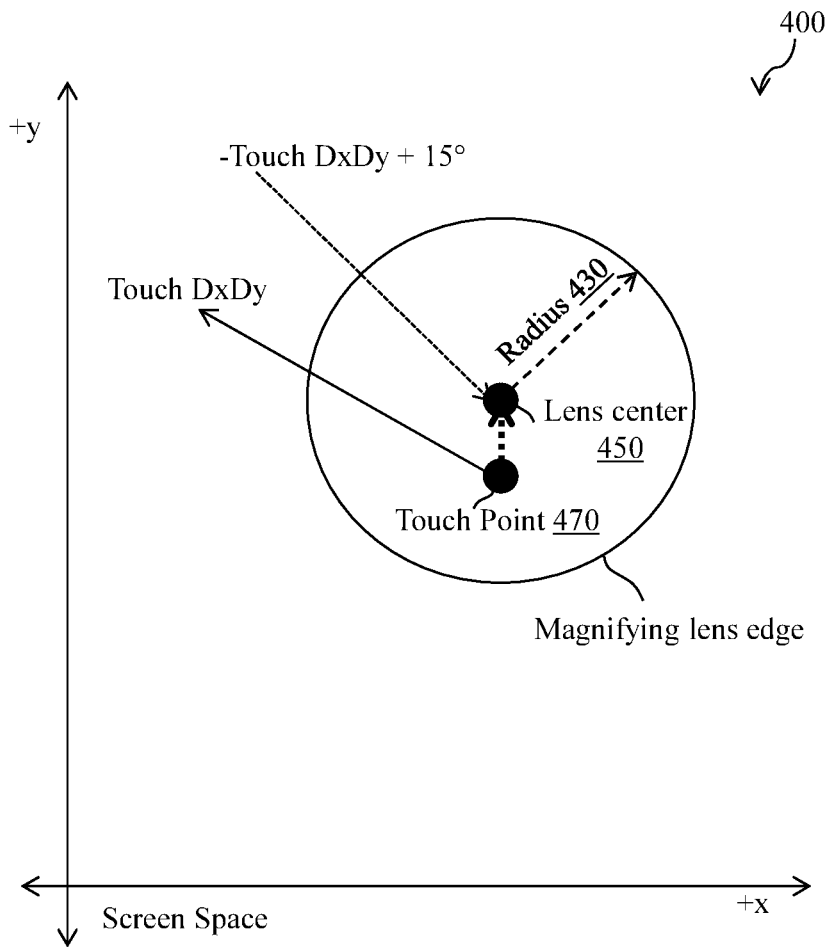
FIG. 4A illustrates embodiments of parameters of a display screen space, which may be used to render a lens animation effect.
Figure 4B:
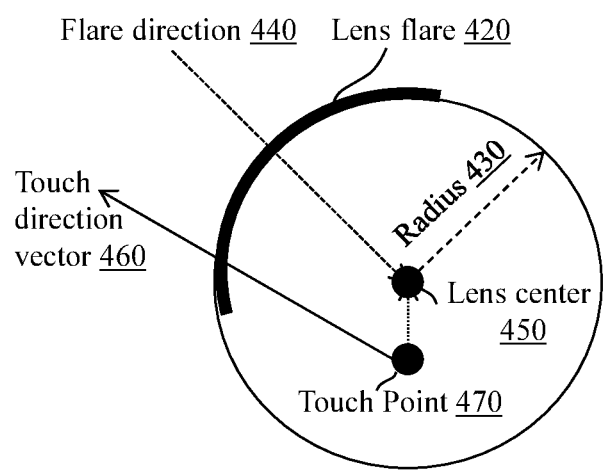
FIG. 4B illustrates an embodiment of display screen space parameters that may be used to render a lens animation effect.

FIG. 4A and FIG. 4B illustrate an embodiment of how a display screen space may be used to render a lens animation effect 400, which may be substantially similar to lens animation effect 200. FIG. 4A depicts which parameters of a display screen space may be used to render a lens animation effect 400, whereas FIG. 4B details how those parameters of a display screen space may be used to render a lens animation effect 400. The lens animation effect 400 may occupy a region of content on a display, which may take any suitable shape or form. In an embodiment, the region of content may be a circle that is defined by a radius 430 and a lens center 450 (or a lens animation effect center 450). The radius 430 may be provided to a graphic engine or graphical effects shader as an effect parameter. Details of the graphic engine and shaders can be found in U.S. patent application Ser. No. 13/633,710 entitled "User Interface Display Composition with Device Sensor/State Based Graphical Effects", which is incorporated herein by reference.

In an embodiment, the location of the lens animation effect center 450 may be offset vertically from a location of a user's touch point 470 by a distance of about half the radius 430. The lens animation effect center 450 may be rendered above the touch point 470 so that less of the lens animation effect 400 may be covered by the user's finger. Note that any other offset distance may be used depending on the design.

A touch direction vector 460 may be determined by a touch sensor, and may comprise a direction that is the inverse of the user's movement on the display device 140. In an embodiment, a touch direction vector 460 may describe how to return to a previous touch location instead of how the lens animation effect 400 arrived at the current location. The direction of the vectors may be reversed depending on the design. A lens flare 420 may be designed, which may be similar to the flare 220. A flare direction 440, which may be characterized by the center direction of the lens flare 420, may be shifted about 15 degrees (15°) or any other angle from the touch direction vector 460.

Changing a magnification level in an image layer may comprise moving vertices so that a surface of the lens animation effect 400 covers additional display screen space. In this situation, a circular region within an image layer (instead of the entire layer) may be magnified. The vertices may not be subject to modification. As such, the lens animation effect 400 may be implemented with texture coordinates inside a fragment shader. In computer graphics, a fragment may refer to data necessary to generate a single pixel's worth of a drawing primitive in a frame buffer. The data may include, but is not limited to: raster position, depth, interpolated attributes (e.g., color, texture coordinates, etc.), stencil, alpha, window identifier (ID), and combinations thereof.

Figure 5:
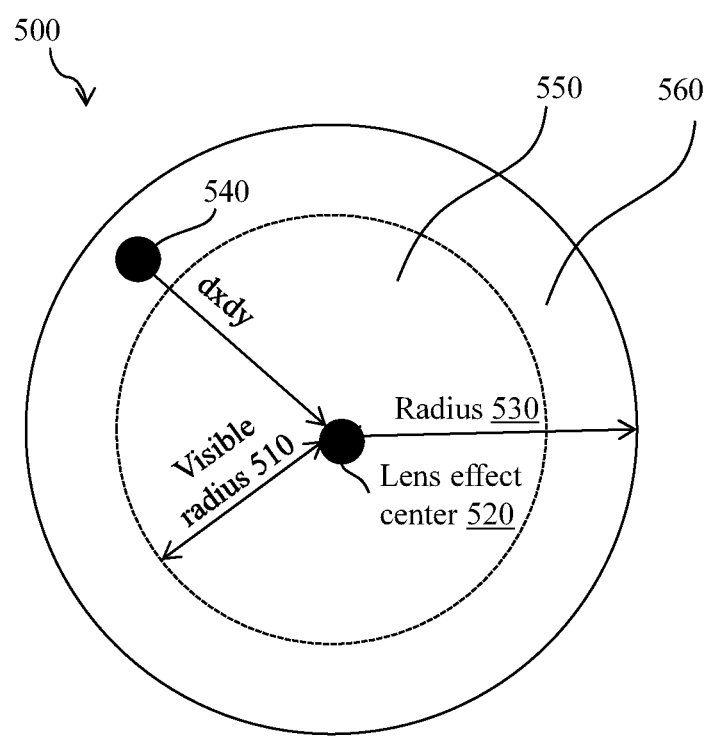
FIG. 5 illustrates an embodiment of a lens distortion of the lens effect feature, which may be implemented with texture coordinates.

FIG. 5 illustrates an embodiment of how lens distortion of a touch effect 500, which may be substantially similar to lens animation effect 200, may be implemented with texture coordinates. As discussed supra, the lens animation effect 400 may occupy a region defined by a circular region within a lens radius 530, which may be substantially similar to radius 430, of a lens animation effect center 520. Furthermore, the region of the display screen space covered by a lens animation effect 500 may be subdivided into two sub-regions. The first sub-region may comprise a region of a display screen area within a visible radius 510 from a lens effect center (e.g. a visible region 550). The second sub-region may comprise a region defined by a display screen area between a visible radius 510 and a radius 530 from a lens effect center 520 (e.g. an overwritten region 560).

The lens distortion of the lens animation effect 500 may have each surface pixel tested, e.g., inside a fragment shader, to identify whether a surface pixel is positioned inside or outside of a visible region 550. If a surface pixel is inside the visible region 550 of the lens animation effect 500, a new texture coordinate may be calculated and mapped to a visible radius 510 of the lens animation effect 500. Such surface pixels that are determined to fall within a visible region may be magnified. Surface pixels that fall inside an overwritten region 560 may be discarded and may not be rendered. Such surface pixels that are determined to fall within an overwritten region 560 may be overwritten by magnified surface pixels within a visible region 550. Thus, the surface pixels within a visible region 550 may be expanded to cover display screen space occupied by the lens animation effect 500. As a result, surface pixels determined to fall within an overwritten region 560 may be lost. A mapping may be performed along a direction vector that describes a relationship between the current fragment 540 and a lens effect center 520. A scaling of the visible radius 510 to the lens radius 530 may be performed to generate texture coordinates. Thus, the lens distortion may be a distortion of the display device 140 GUI in place.

Figure 6A:
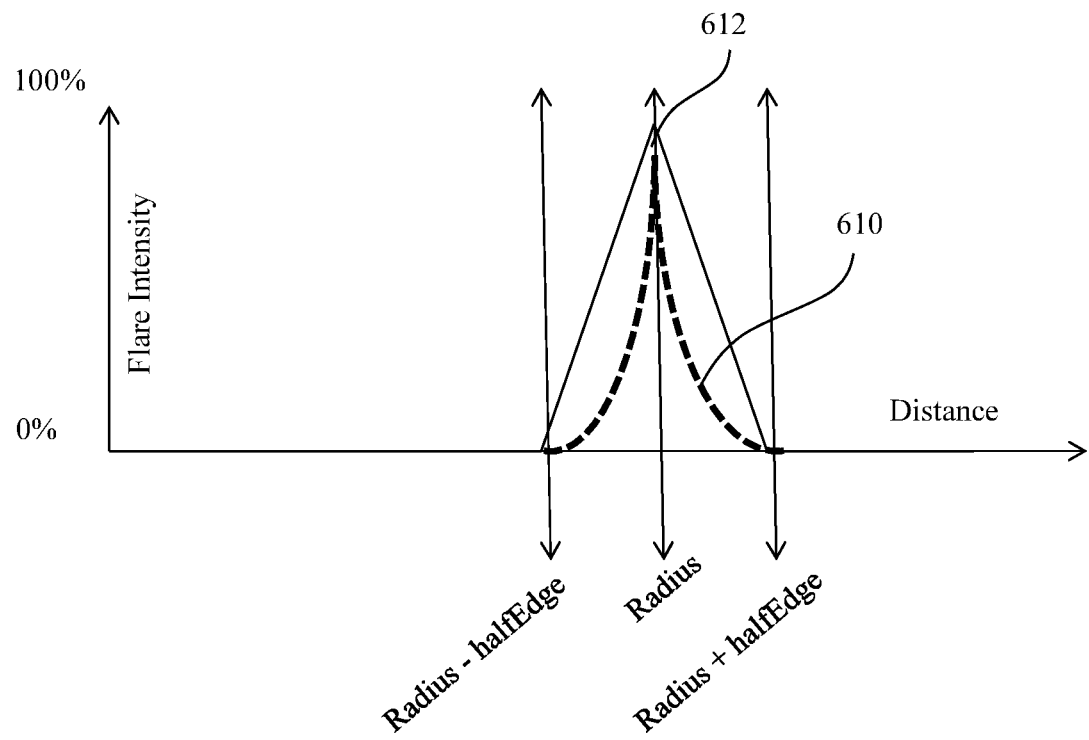
FIGS. 6A and 6B illustrate an embodiment of variable lens flare intensity based on the distance from the lens effect edge.
Figure 6B:
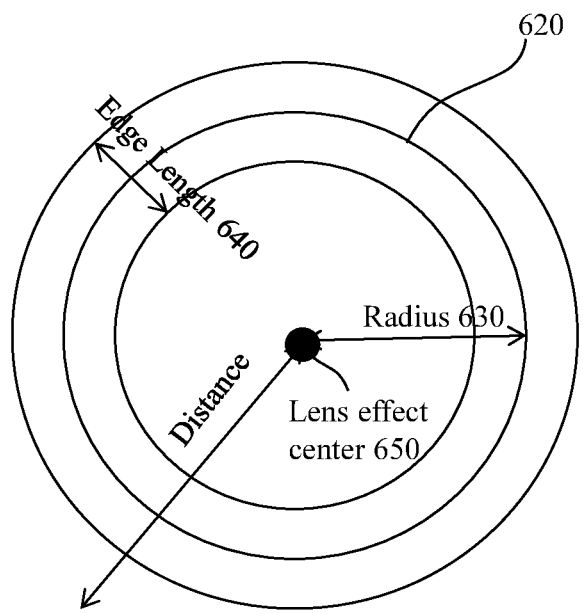

FIGS. 6A and 6B illustrate an embodiment of how the intensity of a lens flare may vary depending on a distance from an edge 620. A peak intensity 612 of a lens flare may be found at an edge 620 located at a distance equal to a radius 630, which may be substantially similar to radius 430, from a lens effect center 650. The intensity of the lens flare may taper away at texture coordinate of distances equal to the radius 630 plus half the distance of an edge length 640 and the radius 630 minus half the distance of an edge length 640. For example, the polynomial profile 610 peaks at the edge 620 of the magnified area and then tapers along two sides of the edge 620.

A rendered region is a magnified version of the original region of content, thus enhanced display readability may be achieved to improve user experience without increasing component costs. Additionally, a cost effective implementation may allow price conscious manufacturers to remain competitive.

To illustrate principles of the present disclosure, examplary implementations of animated lens touch effect are described herein as tables comprising programming codes. As one of ordinary skill in the art will understand programming codes or pseudo-codes expressed herein, not all variables, syntaxes, functions, and notes are described in detail. Further, although codes here are mostly written in OpenGL Shading Language (GLSL), any other suitable programming language and/or operating environment may be used within the principles disclosed herein.

An examplary implementation starts with building a vertex shader, as shown in Table 1, and then moves on to developing a magnifying lens inside a fragment shader.

TABLE 1

```
void main( )
{
   gl_Position = vec4((vec3(a_position, 1) * MVMatrix).xy, 0, 1);
   v_texCoord.st = (vec3(a_texCoord, 1) * TMatrix).st;
}
```

The dimensions of a lens model may be passed in using effect parameters, e.g., as defined in Table 2. For example, two parameters can be lens radius and magnification level (in percent). The percent magnification may be used to calculate a visible radius.

TABLE 2

```
uniform vec4 EFFECT;
#define INTENSITY EFFECT.x
#define MAGNIFY EFFECT.z
#define RADIUS EFFECT.w
```

The last component of the model needed for the magnification component is a touch location, which may be detected by a touch sensor. Note that as a finger may make contact with an area, instead of a single point, of a touch screen, the touch sensor or a processor may determine a central point or location of finger contact, which is denoted as FINGER1 in Table 3.

TABLE 3

```
uniform vec4 FingerAData;
#define FINGER1 FingerAData.xy
#define FINGER1DXDY FingerAData.zw
```

After defining finger contact point, a center of lens radius may be established. For example, the center of the lens may be offset vertically by half of the radius from the touch location, as shown in Table 4.

TABLE 4

```
vec2 finger = FINGER1 + vec2(0, RADIUS/2.0);
```

In practice, a mobile device may not always operate in the vertical orientation, the default normal orientation set by an operating system (OS) such as ANDROID, WINDOWS, iOS, or any other OS. Instead, the orientation of a mobile device may vary, e.g., the mobile device may be held vertically or horizontally. Thus, the disclosed lens touch effect may be designed to work with any device orientation. For example, an orientation matrix may be applied to the lens center offset before the addition. Two choices of orientation matrices denoted as OMatrix and OtMatrix may be considered, wherein the OtMatrix generates texture coordinates, and the OMatrix needs World Space coordinates. In an embodiment, an orientation matrix may be created by inverting the first column of the OMatrix, as shown in Table 5.

TABLE 5

```
vec2 finger = FINGER1 + vec2(0, RADIUS/2.0) * mat2(-OMatrix[0], OMatrix[1]);
```

After determining the lens center, the next step is to determine where a current fragment is relative to the lens center, e.g., as shown in Table 6, wherein d stands for distance between the current fragment and the lens center.

TABLE 6

```
vec2 dxdy = gl_FragCoord.xy - finger;
float d = length(dxdy);
vec2 dxdyNorm = normalize(dxdy);
```

If the distance from the lens center to the current fragment is less than the lens radius (i.e., d<radius), the current fragment may be magnified. Thus, a new texture coordinate may be calculated, e.g., as shown in Table 7.

TABLE 7

```
vec2 tcoord = v_texCoord.st;
if (d < RADIUS) {
   float zoom = INTENSITY * MAGNIFY * length(LayerSize/ScreenSize);
   float l = zoom * d / length(LayerSize);
   vec2 offset = l * (dxdyNorm * OMatrix);
   tcoord += offset * DtMatrix;
}
```

To illustrate the principles in Table 7, consider that when calculating a new texture coordinate offset, a number of factors including the current orientation of the mobile device and the texture bitmap layout may be taken into account. The device orientation may be applied to a direction vector, and a texture offset generated via calculation may be transformed by a texture matrix to account for the internal format of the GUI or application surface.

A texture offset may be calculated using a standard equation for a line using vector math, as shown in equation (1).

$$p = p' + l \times \hat{v} \qquad (1)$$

wherein p' is a current fragment location, and $\hat{v}$ is a normalized direction vector. This leaves a magnified distance l, which can be calculated as shown in Table 8.

TABLE 8

```
float zoom = INTENSITY * MAGNIFY * length(LayerSize/ScreenSize);
float l = zoom * d / length(LayerSize);
```

Note in Table 8 that d represents an original distance between the current fragment and the lens center, while l represents a magnified distance between the magnified fragment and the lens center.

The set of equations in Table 8 can be built piece by piece, beginning with setting a current magnification level denoted as MAGNIFY. As shown in Table 9, the magnification level is multiplied by an effect intensity denoted as INTENSITY. As the intensity parameter can be designed to be time-dependent, the lens may become visible and disappear depending on the duration of the user touch.

TABLE 9

```
float zoom = INTENSITY * MAGNIFY;
```

A calculated offset may be in texture coordinates, which are independent of the actual size of an image layer. In an embodiment, the magnification level may be set to be in the screen space instead of the texture space, so that all image layers may receive the same magnification level regardless of their dimensions. Thus, the magnification level may be scaled, as shown in Table 10, for compensation purposes.

TABLE 10

```
float zoom = INTENSITY * MAGNIFY * length(LayerSize/ScreenSize);
```

If the magnification level is multiplied by the distance from the fragment to lens center, the length l in screen space coordinates may be calculated as shown in Table 11.

TABLE 11

```
float l = zoom * d;
```

Then, the length l may be converted into the texture space as shown in Table 12.

TABLE 12

```
float l = zoom * d / length(LayerSize);
```

As much of the calculations for building the lens effect are not dependent upon the actual fragment coordinate, further optimization algorithms can be applied on the lens. For example, some calculations may be conducted by the Vertex Shader and can be passed along as varying. In an embodiment, lens offset calculations and magnification calculations may be conducted by the Vertex Shader, starting with a varying declaration as shown in Table 13.

TABLE 13

```
varying vec3 v_magnify;
```

In the Vertex Shader, the logic as shown in Table 14 is implemented.

TABLE 14

```
v_magnify.xy = vec2(0, RADIUS/2.0) * mat2(-OMatrix[0], OMatrix[1]);
v_magnify.z = INTENSITY * MAGNIFY * length(LayerSize/
                                     ScreenSize) /length(LayerSize);
```

Accordingly, the Fragment Shader may be simplified as Table 15.

TABLE 15

```
vec2 finger = FINGER1 + v_magnify.xy;
vec2 dxdy = gl_FragCoord.xy - finger;
```

TABLE 15-continued

```
float d = length(dxdy);
vec2 dxdyNorm = normalize(dxdy);
vec2 tcoord = v_texCoord.st;
if (d < RADIUS) {
    vec2 offset = v_magnify.z * d * (dxdyNorm * OMatrix);
    tcoord += offset * DtMatrix;
}
```

As described supra, the disclosed lens touch effect includes a lens flare that creates part of the animation effect. In an embodiment, a flare may be rendered relative to the touch sensor direction vector. For additional visual interest, an angle of the flare may be offset from the touch direction vector, e.g., by 15 degrees. To accomplish the angular offset, one may invert and rotate the touch direction vector inside the Vertex Shader as shown in Table 16.

TABLE 16

```
#define SIN15 (0.2588190)
#define COS15 (0.9659258)
const mat2 rotMatrix = mat2(COS15, SIN15, -SIN15, COS15);
dxdy = normalize(-dxdy) * rotMatrix;
```

When dealing with direction vectors, it is possible that the touch direction vector is a null vector, e.g., when a user has only tapped on a display or has not moved his finger on the display. In this case, a default state may be set. For example, as a null direction vector may not encode any information, the null direction vector may be mapped to a vector with zero degrees of angle. A normalized vector may be output as a varying as shown in Table 17.

TABLE 17

```
vec2 dxdy = FINGER1DXDY;
if (dxdy == vec2(0.0, 0.0))
    dxdy = vec2(COS15, SIN15);
else
    dxdy = normalize(-dxdy) * rotMatrix;
v_texCoord.pq = dxdy;
```

The flare may be generated inside a Fragment Shader. In an embodiment, a width of the flare is centered on the edge of the lens, that is, a maximum flare intensity occurs at the edge, and the flare intensity tapers away at two sides of the edge. The profile of the intensity may be realized using any suitable type of filter, such as a simply polynomial filter.

In an embodiment, the angular width of the flare may be defined through angular filtering. For example, as shown Table 18, the cosine of an angle between two direction vectors may be calculated to define the intensity of the flare in the tangential dimension.

TABLE 18

```
float flare = max(dot(dxdyNorm, v_texCoord.pq), 0.0);
```

In Table 18, function max( ) determines the intensity of the flare (denoted in short as flare) based on how close a current pixel or fragment is to the direction of finger movement. For example, if a current fragment is on the other side of the lens (i.e., angle between pixel and finger movement direction is over 180°), the cosine of this angle comes out to be between −1 and 0, and the output of the function max( ) equals zero, indicating no flare for this current fragment.

Next, the intensity of the flare may be sharpened, e.g., by applying another filter so that the flare is not visible for a full 180°. The filter may be applied simply by squaring the intensity parameter, as shown in Table 19.

TABLE 19 flare = flare * flare

As described supra, the flare may also be modulated or filtered in the axial or radial direction. As shown in Table 20, the flare is filtered based upon the distance from a current fragment to the lens center.

TABLE 20 flare = flare * max(0.0, 1.0-abs(d-RADIUS)/HALF_FLARE);
flare = flare * flare * flare;

The flare is animated in and out based upon the effect intensity. After intensity filtering in both the tangential dimension and in the radial dimension, the flare may be applied to the current fragment as shown in Table 21, wherein INTENSITY is a parameter dependent on time or other sensor input (e.g., force or pressure).

TABLE 21 gl_FragColor = color + flare*flare*flare*INTENSITY

As illustrated by detailed descriptions above, an animated lens touch effect may be built using a set of shaders such as vertex shader and fragment shader. In an embodiment, the set of shaders for the animated lens touch effect can be expressed by programming codes shown in Table 22 and Table 23. Note that the programming codes contain explanatory notes followed by "//".

TABLE 22

```
precision mediump float;
#define EFFECT Effect6Ctrl
attribute vec4 a_vertex;
#define a_position a_vertex.xy
#define a_texCoord a_vertex.zw
uniform mat3 MVMatrix;
uniform mat3 TMatrix;
uniform mat2 OMatrix;
uniform vec2 ScreenSize;
uniform vec2 LayerSize;
varying vec4 v_texCoord;
varying vec3 v_magnify;
uniform vec4 EFFECT;
#define INTENSITY EFFECT.x
#define MAGNIFY EFFECT.z
#define RADIUS EFFECT.w
uniform vec4 FingerAData;
#define FINGER1 FingerAData.xy
#define FINGER1DXDY FingerAData.zw
#define SIN15 (0.2588190)
#define COS15 (0.9659258)
void main( )
{
   gl_Position = vec4((vec3(a_position, 1) * MVMatrix).xy, 0, 1);
   v_texCoord.st = (vec3(a_texCoord, 1) * TMatrix).st;
   const mat2 rotMatrix = mat2(COS15, SIN15, -SIN15, COS15);
   vec2 dxdy = FINGER1DXDY;
   if (dxdy == vec2(0.0, 0.0))
      dxdy = vec2(COS15, SIN15);
   else
      dxdy = normalize(-dxdy) * rotMatrix;
   v_texCoord.pq = dxdy;
   // Calculate shift of touch location to center of lense
```

TABLE 22-continued

```
   // Calculate ScreenSpace Orientation Matrix, OMatrix is for World
   // Space
   v_magnify.xy = vec2(0, RADIUS/2.0) * mat2(-OMatrix[0], OMatrix[1]);
   // Intensity * magnfication * layer to screen ratio
   // Divide by pixel size in texture units to optimize fragment shader.
   // Fragment shader needs to convert touch radius in pixels to texture
   // space.
   v_magnify.z = INTENSITY * MAGNIFY * length(LayerSize/
                                 ScreenSize) /length(LayerSize);
}
```

TABLE 23

```
#extension GL_OES_EGL_image_external : require
precision mediump float;
#define EFFECT Effect6Ctrl
varying vec4 v_texCoord;
varying vec3 v_magnify;
#ifdef TEXTURE
uniform sampler2D Texture;
uniform float Alpha;
#endif
#ifdef APP_SURFACE_TEXTURE
uniform samplerExternalOES Texture;
uniform float Alpha;
#endif
uniform vec4 EFFECT;
#define INTENSITY EFFECT.x
#define MAGNIFY EFFECT.z
#define RADIUS EFFECT.w
uniform vec4 FingerAData;
uniform mat2 DtMatrix;
uniform mat2 OMatrix;
uniform float ScreenDensity;
#define FINGER1 FingerAData.xy
#define HALF_FLARE (RADIUS * 0.05 * ScreenDensity)
void main( )
{
   vec2 finger = FINGER1 + v_magnify.xy;
   // Calculate distance and direction to finger touch point
   vec2 dxdy = gl_FragCoord.xy - finger;
   float d = length(dxdy);
   vec2 dxdyNorm = normalize(dxdy);
   vec2 tcoord = v_texCoord.st;
   // Calculate zoom distortion
   if (d < RADIUS) {
      vec2 offset = v_magnify.z * d * (dxdyNorm * OMatrix);
      tcoord += offset * DtMatrix;
   }
#ifdef REPLACE
   vec4 color = texture2D(Texture, tcoord);
#endif
#ifdef TEXTURE_PREMULTIPLY
   vec4 color = texture2D(Texture, tcoord) * Alpha;
#endif
#ifdef TEXTURE_MODULATE_ALPHA
   vec4 color = texture2D(Texture, tcoord);
   color.a * = Alpha;
#endif
   // Calculate lense flare
   float flare = max(dot(dxdyNorm, v_texCoord.pq), 0.0);
   flare = flare * flare * max(0.0, 1.0-abs(d-RADIUS)/HALF_FLARE);
   gl_FragColor = color + flare*flare*flare*INTENSITY;
}
```

In an embodiment, basic shaders such as vertex shader and fragment shader may be installed as shown in Table 24.

TABLE 24

```
String vertex = JavaUtil.readShaderSource(mContext, "lenseTouch.vertex");
String fragment = JavaUtil.readShaderSource(mContext, "lenseTouch.fragment");
hem.setGlobalEffectShader(MC,
                          mGlobalEffectSet,
                          HuaweiEffectsManager.TEXTURE_SHADER, vertex, fragment,
                          0, 0, true, false, false, 1, 1, 0,
                          HuaweiEffectsManager.TRACE_LEVEL_OFF);
hem.setGlobalEffectShaderOpaque(MC,
                          mGlobalEffectSet,
                          HuaweiEffectsManager.TEXTURE_SHADER, vertex, fragment,
                          0, 0, true, false, false, 1, 1, 0,
                          HuaweiEffectsManager.TRACE_LEVEL_OFF);
hem.setShaderSetBehavior(MC,
                          mGlobalEffectSet, true, (1 << mColorEffect));
hem.setGlobalEffectActiveSet(MC,
                          mGlobalEffectSet,
HuaweiEffectsManager.DEFAULT_SET_TYPE);
```

In an embodiment, clip regions, which may refer to magnifying areas, may be configured as shown in Table 25, which binds touch sensor variables to the center of a bounding box.

TABLE 25

```
hem.setEffectBehavior(MC,
                      mColorEffect, true,
                      HuaweiEffectsManager.SMOOTH_INTENSITY,
                      HuaweiEffectsManager.STOP_START_TIME,
                      HuaweiEffectsManager.SMOOTH_INTENSITY_IF_BUSY, 0,
                      HuaweiEffectsManager.LINEAR,
                      HuaweiEffectsManager.CLIP_BOUND_OUTSIDE,
                          HuaweiEffectsManager.Finger1X,
                          HuaweiEffectsManager.Finger1Y,
                      HuaweiEffectsManager.MAX_VARIABLES,
                          HuaweiEffectsManager.MAX_VARIABLES,
                      HuaweiEffectsManager.AppADataZ,
                          HuaweiEffectsManager.AppADataW,
                          (int)(32*mDensity), (int)(32*mDensity));
```

Variable configuration show in Table 25 may be considered similar to a touch spin effect. However, one difference is that the animated lens touch effect uses touch sensor direction variables, which are configured as direction vectors for proper interpolation. The interpolation of the direction vectors also provides a needed filter in addition to providing a pleasing visual effect. For example, when a user finger is held on a touch screen, a touch sensor may report small movements, in which case direction vectors for thee small movements may swing wildly. Thus, the time based interpolation may help filter out the sensor noise, as shown in Table 26.

TABLE 26

```
hem.configEffectVariable(MC,
                          HuaweiEffectsManager.AppADataZ, (int) (240*mDensity),
                          HuaweiEffectsManager.NO_COORD, 0,
                          HuaweiEffectsManager.IMMEDIATE, 1, 0, 0);
hem.configEffectVariable(MC,
                          HuaweiEffectsManager.AppADataW, (int) (240*mDensity),
                          HuaweiEffectsManager.NO_COORD, 0,
                          HuaweiEffectsManager.IMMEDIATE, 1, 0, 0);
hem.configEffectVariable(MC,
                          HuaweiEffectsManager.Finger1X, (int) 0,
                          HuaweiEffectsManager.ANDROID_CANVASX_COORD,
                      HuaweiEffectsManager.Finger1Y,
                          HuaweiEffectsManager.IMMEDIATE, 1, 200, 30);
hem.configEffectVariable(MC,
                          HuaweiEffectsManager.Finger1Y, (int) 0,
                          HuaweiEffectsManager.ANDROID_CANVASY_COORD,
                      HuaweiEffectsManager.Finger1X,
                          HuaweiEffectsManager.IMMEDIATE, 1, 200, 30);
hem.configEffectVariable(MC,
                          HuaweiEffectsManager.Finger1dX, (int) 0,
                          HuaweiEffectsManager.ANDROID_CANVASX_VECTOR_COORD,
                      HuaweiEffectsManager.Finger1dY,
                          HuaweiEffectsManager.LINEAR, 1, 100, 60);
```

TABLE 26-continued

```
hem.configEffectVariable(MC,
                HuaweiEffectsManager.Finger1dY, (int) 0,
                HuaweiEffectsManager.ANDROID_CANVASY_VECTOR_COORD,
HuaweiEffectsManager.Finger1dX,
                HuaweiEffectsManager.LINEAR, 1, 100, 60);
```

When configuring a sensor filter, direction vectors may be requested by a shader. In an embodiment, magnification levels and the size of the touch lens may be passed to a shader as parameters, as shown in Table 27.

TABLE 27

```
hem.setTouchSensorBehavior(MC,
                mColorEffect, (float)-0.12, 72*mDensity, //
p1=Magnification, p2=radius
                350, 60, 0,
                        // Start duration, fps, ccw
                60, 0,
                                // Stop duration, ccw
                // Intensity Start - Delay, algorithm, duration, end
intensity
                0, HuaweiEffectsManager.LOGARITHMIC, 350, 100,
                // Time Start - Delay, algorithm, period, cycles
                0, HuaweiEffectsManager.LINEAR, 0, (float)0,
                // Intensity Stop - Delay, algorithm, duration, end
intensity
                0, HuaweiEffectsManager.LOGARITHMIC, 350,
                // Time Stop - Delay, algorithm, period, cycles
                0, HuaweiEffectsManager.LINEAR, 0, (float)0,
                HuaweiEffectsManager.TOUCH_FILTER_TRACK_WITH_DXDY, 18);
hem.startSensorEffect(MC,
                mColorEffect, HuaweiEffectsManager.SENSOR_TYPE_TOUCH);
```

One or more software development kits (SDKs) may be used in installing shaders. In an embodiment, a GlobalEffect class may be used to install the magnifying lens touch effect disclosed herein. Firstly, effect shaders, behavior, clip region, and touch sensor control may be setup as shown in Table 28.

TABLE 28

```
Shader shader = new Shader(new GLSLProgram(mThis,
        "Touch/lenseTouch.vertex",
        "Touch/lenseTouch.fragment",
        GLSLProgram.TraceLevel.MEDIUM), true, false,
        new Shader.Projection(0, 0.0f),
        Shader.Tessellation.NONE);
mGlobalEffect.setShaders(new Shader[ ]{ shader });
EffectBehavior behavior = new EffectBehavior(
        EffectBehavior.Time.STOP_START,
        EffectBehavior.Intensity.SMOOTH,
        EffectBehavior.Busy.SMOOTH_INTENSITY_IF_BUSY,
        0, InterpolationAlgorithm.LINEAR);
mGlobalEffect.setBehavior(behavior);
ClipRegion magnifyClipRegion = new ClipRegion(
        ClipRegion.Function.CLIP_BOUND_OUTSIDE,
        Variable.ID.Finger1X.value( ),
        Variable.ID.Finger1Y.value( ),
        Variable.MAX_VARIABLES, Variable.MAX_VARIABLES,
        Variable.ID.AppADataZ.value( ),
        Variable.ID.AppADataW.value( ),
        (int) (32 * density), (int) (32 * density));
mGlobalEffect.setClipRegion(magnifyClipRegion);
OnAnimationControl on = new OnAnimationControl(100,
        350, 60, new IntensityInterpolation(350, 0,
                InterpolationAlgorithm.LOGARITHMIC),
        new TimeInterpolation(0, 0, 0f, false,
                InterpolationAlgorithm.LINEAR));
```

TABLE 28-continued

```
OffAnimationControl off = new OffAnimationControl(60,
        new IntensityInterpolation(350, 0,
                InterpolationAlgorithm.LOGARITHMIC),
        new TimeInterpolation(0, 0, 0f, false,
                InterpolationAlgorithm.LINEAR));
TouchSensorControl tsc = new TouchSensorControl(on,
        off,
        TouchSensorControl.Filter.TRACK_WITH_DX_DY, 18);
mGlobalEffect.setTouchControl(tsc);
```

Similar to the touch spin effect, variable configuration may be done either way so variables in an effect object may be configured on installation, as shown in Table 29.

TABLE 29

```
Variable[ ] vars = new Variable[ ] {
        new Variable(Variable.ID.AppADataZ,
                (int) (240 * density),
                InterpolationAlgorithm.IMMEDIATE, 0, 0,
                1.0f),
        new Variable(Variable.ID.AppADataW,
                (int) (240 * density),
                InterpolationAlgorithm.IMMEDIATE, 0, 0,
                1.0f),
        new Variable(Variable.ID.Finger1X, 0,
                Variable.CoordinateSystem.CANVAS_X,
                Variable.ID.Finger1Y,
                InterpolationAlgorithm.IMMEDIATE, 200,
                30, 1.0f),
        new Variable(Variable.ID.Finger1Y, 0,
                Variable.CoordinateSystem.CANVAS_Y,
                Variable.ID.Finger1X,
                InterpolationAlgorithm.IMMEDIATE, 200,
                30, 1.0f),
```

TABLE 29-continued

```
        new Variable(
            Variable.ID.Finger1dX,
            0,
            Variable.CoordinateSystem.CANVAS_X_VECTOR,
            Variable.ID.Finger1dY,
            InterpolationAlgorithm.LINEAR, 100, 60,
            1.0f),
        new Variable(
            Variable.ID.Finger1dY,
            0,
            Variable.CoordinateSystem.CANVAS_Y_VECTOR,
            Variable.ID.Finger1dX,
            InterpolationAlgorithm.LINEAR, 100, 60,
            1.0f) };
mGlobalEffect.setVariables(vars);
```

After setting effect parameters and IDs, effect shaders may be installed and activated. Once the effect shaders are active, a touch sensor may be enabled for allowing the animated lens touch effect, as shown in Table 30.

TABLE 30

```
mGlobalEffect.setPriority(Effect.Priority.PRIORITY_0);
mGlobalEffect.setEffectId(Effect.ID.EFFECT6);
mGlobalEffect.setShaderSetId(mGlobalSetId);
mGlobalEffect.setAppData1(-0.12f);
mGlobalEffect.setAppData2(72 * density);
mGlobalEffect.install( );
mGlobalEffect.activate(null);
mGlobalEffect.startTouchSensor( );
```

Figure 7:
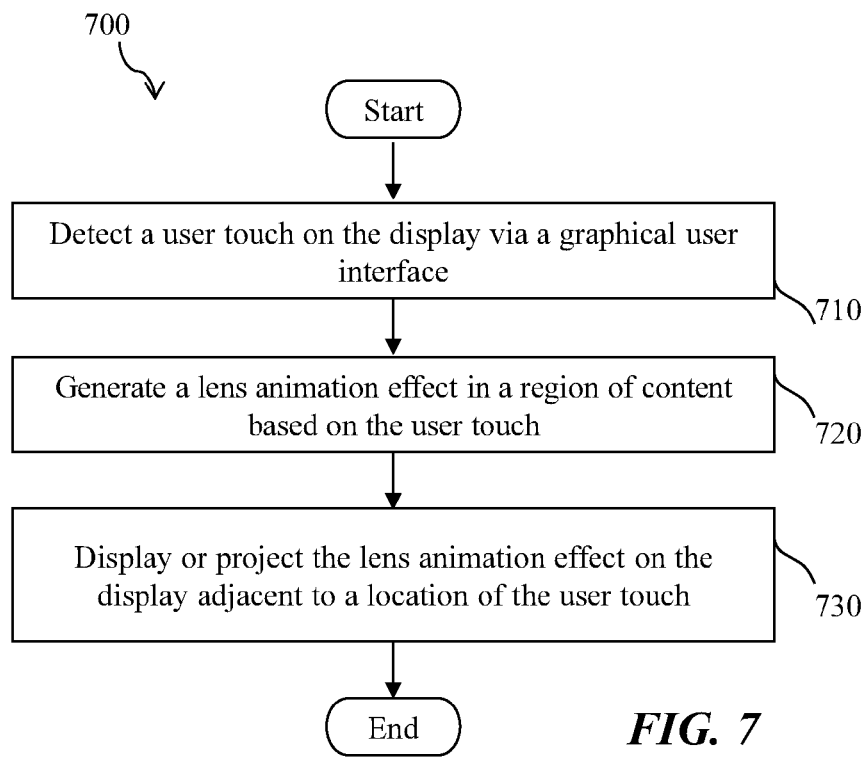
FIG. 7 is a flowchart of an embodiment of a content displaying method.

FIG. 7 is a flowchart of an embodiment of a content displaying method 700, which may be implemented by any computer system equipped with a touch sensitive display. For example, the mobile device 100 may implement the method 700. In step 710, the mobile device may detect or recognize a user touch on the display via a graphical user interface. The user touch may be initiated by a finger, a stylus, a touch sensitive pen, or any other equivalent means. Note that a finger contact disclosed herein is equivalent to other means of contacting a display, e.g., using a stylus or pen, as long as the contact can be detected by the mobile device. Detection of the user touch may be accomplished by one or more touch sensors.

In step 720, the mobile device may render or generate a lens animation effect in a region of content based on the user touch. The lens animation effect may at least magnify the region of content shown on the display by a magnification level that depends on a duration of the user touch. As described supra, the lens animation effect may be generated to create or to simulate an appearance of an animated lens, which has been placed on the display as a result of the user touch. Intuitively, it is as if the glass was bent by the user touch.

In an embodiment, the magnification level that depends on a duration of the user touch may at least initially increase for a period of any suitable length. For example, the magnification level may start from a first level that yields no magnification upon detection of the user touch. The first level may simply be one or 100%. Then, the magnification level may seamlessly or continuously increase until the magnification level reaches a pre-determined maximum value, or until the user touch can no longer be detected, whichever occurs sooner. Note that reaching the pre-determined maximum value (e.g., 2, 3, 5, or any other value) includes the situation where a pre-determined time value (e.g., 1 second, 2 seconds, or 4 seconds) is reached. After the user touch is no longer detected, the magnification level may continuously decrease or return to the first level (e.g., one).

In an embodiment, the lens animation effect further comprises an animated lens flare situated along an edge of a magnified region, wherein the animated lens flare at least indicates the direction of user touch movement. The region of content after magnification is displayed as the magnified region.

In an embodiment, the graphical user interface comprises a screen space, a texture space, and a plurality of image layers. The magnification level may be set in the screen space such that the plurality of image layers receive the same magnification level regardless of layer sizes.

In step 730, the mobile device may display or project the lens animation effect on the display adjacent to a location of the user touch. In an embodiment, the lens animation effect simulates a magnifying lens that converts the region of content into a concentric magnified region, wherein a visible radius of the region of content multiplying the magnification level equals a radius of the magnified region.

In an embodiment, displaying the lens animation effect in step 730 comprises determining whether a distance between a current fragment and a center of the magnified region is less than the visible radius, and recalculating coordinates of the current fragment for display in the magnified region. As noted supra, unmagnified fragments in the region of content may not be separately displayed outside the magnified region.

It should be understood that method 700 serves for illustrative purposes, thus modification of steps or addition of other steps are within scope of the present disclosure. In implementation, some steps may be executed as sub-step of other steps. For example, the method 700 may further determine a direction of user touch movement to aid the lens flare. The method 700 may further rotate the animated lens flare around a lens effect center along the edge of the magnified region to track movement of a finger initiating the user touch. The lens effect center is adjacent to the location of the user touch such that the location of the user touch falls within the magnified region. Note that the term "adjacent to" means nearby, so any suitable distance (e.g., half the radius of the magnified area) may be configured between the two locations. That is, the lens effect center may be vertically offset by about half the radius above the location of the user touch.

The method 700 may further comprise fixing a direction of the animated lens flare to create an appearance that the animated lens flare tracks the movement of the finger from behind the finger. An angle between the direction of the animated lens flare and an opposite direction of finger movement may be set to about 15 degrees except when there is no finger movement.

In addition, the method 700 may further comprise filtering a spectral intensity (intensity in short) of the animated lens flare in a radial direction such that the intensity at a fragment position is dependent on a distance from the fragment position to the lens effect center. In an embodiment, the filtered intensity follows a polynomial profile that reaches a peak value at about the edge of the magnified region and decreases as the fragment position moves inside or outside the edge. The method 700 may further comprise filtering an intensity of the animated lens flare in a tangential direction using at least trigonometric functions such that an angular width of the animated lens flare is less than 180 degrees (e.g., 60 degrees, 90 degrees, or any other suitable angular width).

Figure 8:
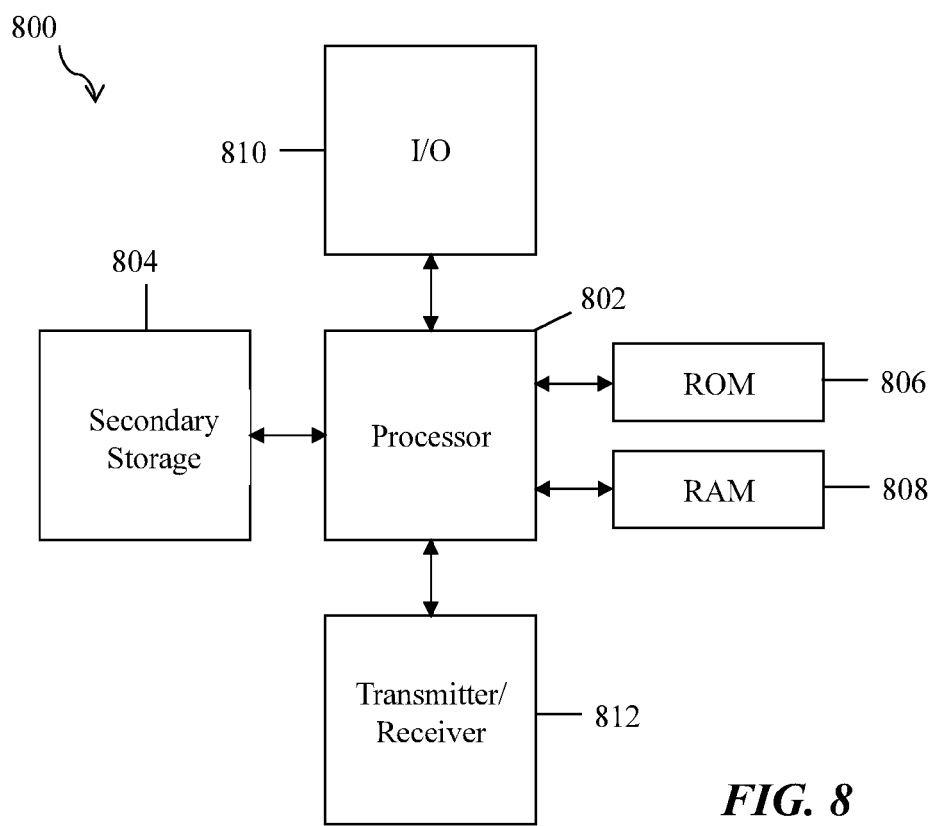
FIG. 8 illustrates an embodiment of a computer system.

The schemes described above may be implemented on a network component, such as a computer or network component with sufficient processing power, memory resources, and network throughput capability to handle the necessary workload placed upon it. FIG. 8 illustrates an embodiment of a computer system or network node 800 suitable for implementing one or more embodiments of the systems disclosed herein, such as the mobile device 100 described supra. Note that the animated lens effect disclosed herein may be implemented by other types of computer systems or electronic devices, such as a desktop computer with a touch screen.

The computer system 800 includes a processor 802 that is in communication with memory devices including secondary storage 804, ROM 806, RAM 808, input/output (I/O) devices 810, and transmitter/receiver (transceiver) 812. Although illustrated as a single processor, the processor 802 is not so limited and may comprise multiple processors. The processor 802 may be implemented as one or more CPU chips, cores (e.g., a multi-core processor), field-programmable gate arrays (FPGAs), application specific integrated circuits (ASICs), and/or digital signal processors (DSPs). The processor 802 may be configured to implement at least part of any of the schemes or methods described herein, including the method 700. The processor 802 may be implemented using hardware or a combination of hardware and software.

The secondary storage 804 is typically comprised of one or more disk drives or tape drives and is used for non-volatile storage of data and as an over-flow data storage device if the RAM 808 is not large enough to hold all working data. The secondary storage 804 may be used to store programs that are loaded into the RAM 808 when such programs are selected for execution. The ROM 806 is used to store instructions and perhaps data that are read during program execution. The ROM 806 is a non-volatile memory device that typically has a small memory capacity relative to the larger memory capacity of the secondary storage 804. The RAM 808 is used to store volatile data and perhaps to store instructions. Access to both the ROM 806 and the RAM 808 is typically faster than to the secondary storage 804.

The transmitter/receiver 812 (sometimes referred to as a transceiver) may serve as an output and/or input device of the computer system 800. For example, if the transmitter/receiver 812 is acting as a transmitter, it may transmit data out of the computer system 800. If the transmitter/receiver 812 is acting as a receiver, it may receive data into the computer system 800. Further, the transmitter/receiver 812 may include one or more optical transmitters, one or more optical receivers, one or more electrical transmitters, and/or one or more electrical receivers. The transmitter/receiver 812 may take the form of modems, modem banks, Ethernet cards, universal serial bus (USB) interface cards, serial interfaces, token ring cards, fiber distributed data interface (FDDI) cards, and/or other well-known network devices. The transmitter/receiver 812 may enable the processor 802 to communicate with an Internet or one or more intranets. The I/O devices 810 may be optional or may be detachable from the rest of the computer system 800. The I/O devices 810 may include a display such as a touch screen or a touch sensitive display. The I/O devices 810 may also include one or more keyboards, mice, or track balls, or other well-known input devices.

It is understood that by programming and/or loading executable instructions onto the computer system 800, at least one of the processor 802, the secondary storage 804, the RAM 808, and the ROM 806 are changed, transforming the computer system 800 in part into a particular machine or apparatus (e.g. a mobile device such as the mobile device 100 having the functionality taught by the present disclosure). The executable instructions may be stored on the secondary storage 804, the ROM 806, and/or the RAM 808 and loaded into the processor 802 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner, as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the mobile device 100) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for content displaying implemented by a mobile device that comprises a display, the method comprising:
    detecting a user touch on the display via a graphical user interface;
    generating a lens animation effect in a region of content based on the user touch, wherein the lens animation effect at least magnifies the region of content shown on the display by a magnification level that depends on a duration of the user touch, wherein the magnification level starts from a first level that yields no magnification upon detection of the user touch and then increases throughout the duration of the user touch, wherein the region of content after magnification is displayed as a magnified region, and wherein the lens animation effect comprises an animated lens flare of the magnified region;
    setting a color of the animated lens flare based on at least one of the duration of the user touch or a pressure of the user touch; and
    displaying the lens animation effect on the display adjacent to a location of the user touch, wherein a center of the lens animation effect is vertically offset from the location of the user touch and based on an orientation of the mobile device.

2. The method of claim 1, wherein the magnification level continuously increases from the first level until the magnification level reaches a maximum value in a seamless manner.

3. The method of claim 1, wherein the magnification level returns to the first level after the user touch is no longer detected.

4. The method of claim 1, wherein a visible radius of the region of content is multiplied by the magnification level to equal a predetermined radius of the magnified region.

5. The method of claim 4, wherein displaying the lens animation effect comprises:
    determining whether a distance between a current fragment and a center of the magnified region is less than the visible radius; and
    recalculating coordinates of the current fragment for display in the magnified region based upon the distance being less than the visible radius.

6. The method of claim 4, wherein unmagnified fragments in the region of content are not separately displayed outside the magnified region.

7. The method of claim 1, wherein the graphical user interface comprises a screen space, a texture space, and a plurality of image layers, and wherein the magnification level is set in the screen space such that the plurality of image layers receive the same magnification level regardless of layer sizes.

8. The method of claim 1, further comprising:
    determining a direction of user touch movement; and
    moving the animated lens flare around a lens effect center along an edge of the magnified region to indicate the direction of user touch movement, wherein the lens effect center is adjacent to the location of the user touch such that the location of the user touch falls within the magnified region.

9. The method of claim 8, wherein the lens effect center is vertically offset by about half a radius of the magnified region above the location of the user touch.

10. The method of claim 8, further comprising fixing a direction of the animated lens flare to create an appearance that the animated lens flare follows the user touch movement opposite the direction of the user touch movement.

11. The method of claim 10, wherein an angle between the direction of the animated lens flare and an opposite of the direction of the user touch movement is about 15 degrees except when there is no finger movement.

12. The method of claim 8, further comprising filtering an intensity of the animated lens flare in a radial direction such that an intensity at a fragment position is dependent on a distance from the fragment position to the lens effect center.

13. The method of claim 12, wherein the filtered intensity follows a polynomial profile that reaches a peak value at about the edge of the magnified region and decreases as the fragment position moves inside or outside the edge.

14. The method of claim 8, further comprising filtering an intensity of the animated lens flare in a tangential direction using at least trigonometric functions such that an angular width of the animated lens flare is less than 180 degrees.

15. An apparatus comprising:
a touch screen configured to display one or more contents; and
one or more processors coupled to the touch screen and configured to:
detect a user touch on the touch screen;
magnify a region of content to create an appearance of an animated lens in response to the user touch, wherein magnifying the region of content uses a magnification level that at least initially increases with a duration of the user touch;
instruct the touch screen to display the magnified region of content;
generate a flare effect of the magnified region of content, wherein the flare effect tracks movement of the user touch;
filter a spectral intensity of the flare effect in a radial direction such that the spectral intensity at a fragment position is dependent on a distance from the fragment position to a circular center of the animated lens;
filter the spectral intensity in a tangential direction such that an angular width of the flare effect is less than 180 degrees; and
setting a color of the flare effect based on at least one of the duration of the user touch or a pressure of the user touch,
wherein the touch screen displays the region of content, and wherein a center of the region of content is vertically offset from a location of the user touch and based on an orientation of the apparatus.

16. The apparatus of claim 15, wherein the magnification level starts from one upon detection of the user touch and then continuously increases in a seamless manner until the magnification level reaches a pre-determined maximum value, or until the user touch can no longer be detected, whichever occurs sooner, and wherein the magnification level continuously decreases to one after the user touch is no longer detected.

17. A computer program product comprising computer executable instructions stored on a non-transitory computer readable medium such that when executed by a computer system cause the computer system to:
recognize a user touch on a screen of the computer system;
render a region of content to simulate an appearance of a lens with a magnification level that varies with a duration of the user touch, wherein the appearance of the lens comprises an animated flare of the rendered region of content;
filter a spectral intensity of the animated flare in a radial direction and a tangential direction for creating a non-uniform intensity profile, wherein an angular width of the animated flare is less than 180 degrees;
set a color of the animated flare based on at least one of the duration of the user touch or a pressure of the user touch; and
display the rendered region of content on the screen, wherein a center of the rendered region of content is vertically offset from a location of the user touch and based on an orientation of the computer system.

18. The computer program product of claim 17, further comprising instructions that cause the computer system to spin the animated flare along an edge of the rendered region of content to track movement of the user touch.

19. The computer program product of claim 17, wherein the magnification level starts from one upon detection of the user touch and then continuously increases in a seamless manner until the magnification level reaches a pre-determined maximum value, or until the user touch can no longer be detected, whichever occurs sooner, and wherein the magnification level continuously decreases to one after the user touch is no longer detected.

* * * * *